United States Patent
Wilson (10) Patent No.: US 10,161,778 B2
(45) Date of Patent: Dec. 25, 2018

(54) ADJUSTABLE SIGHT GAUGE AND DRUM BREATHER ASSEMBLY AND METHOD OF INSPECTING FLUID LEVEL WITH SAME

(71) Applicant: Trico Corp., Pewaukee, WI (US)

(72) Inventor: Jay Wilson, Helenville, WI (US)

(73) Assignee: Trico Corp., Pewaukee, WI (US)

( * ) Notice: Subject to any disclaimer, the term of this patent is extended or adjusted under 35 U.S.C. 154(b) by 399 days.

(21) Appl. No.: 14/733,427

(22) Filed: Jun. 8, 2015

(65) Prior Publication Data
US 2016/0356636 A1 Dec. 8, 2016

(51) Int. Cl.
*G01F 23/02* (2006.01)
*G01F 23/00* (2006.01)

(52) U.S. Cl.
CPC .......... *G01F 23/02* (2013.01); *G01F 23/0046* (2013.01)

(58) Field of Classification Search
CPC ...................................... G01F 23/02
USPC ................................... 73/323–334
See application file for complete search history.

(56) References Cited

U.S. PATENT DOCUMENTS

| | | | |
|---|---|---|---|
| 21,836 A | 10/1858 | Johnson et al. | |
| 707,943 A | 8/1902 | Rockwell | |
| 946,106 A * | 1/1910 | Burns | G01F 23/02 73/329 |
| 986,199 A | 3/1911 | Moser | |
| 1,053,609 A * | 2/1913 | Keller | G01F 23/02 285/148.19 |
| 1,164,484 A | 12/1915 | Ernst | |
| 1,406,929 A | 2/1922 | Butcher | |
| 1,508,272 A * | 9/1924 | Cuff | G01F 23/02 73/326 |
| 2,390,799 A | 12/1945 | Linsenmeyer et al. | |
| 2,431,098 A | 11/1947 | Wallace | |
| 3,154,945 A | 11/1964 | Busillo | |
| 3,212,334 A | 10/1965 | Conlon | |
| 3,292,434 A | 12/1966 | McDaniel | |
| 3,393,564 A * | 7/1968 | Simmons | F04D 13/16 122/379 |
| 3,455,163 A | 7/1969 | Lukas et al. | |
| 3,535,931 A | 10/1970 | Gruett | |
| 3,540,276 A | 11/1970 | Lyden | |
| D223,776 S | 6/1972 | Gruett | |
| 3,820,397 A | 6/1974 | Lyden | |
| 3,835,708 A | 9/1974 | Gruett | |
| 3,886,796 A | 6/1975 | Gruett | |
| 4,050,305 A | 9/1977 | Evans et al. | |
| 4,108,000 A | 8/1978 | Norris | |

(Continued)

FOREIGN PATENT DOCUMENTS

| | | |
|---|---|---|
| GB | 1133798 | 11/1968 |
| WO | 8404163 | 10/1984 |

OTHER PUBLICATIONS

International Search Report and Written Opinion for PCT/US2015/034698 dated Mar. 2, 2016.

*Primary Examiner* — Manish S Shah
*Assistant Examiner* — Nathaniel Kolb
(74) *Attorney, Agent, or Firm* — Andrus Intellectual Property Law LLP (57) ABSTRACT

An adjustable fluid level verification device and method for use on equipment and containers. The device is connected to bung receivers or mounting holes on the equipment or container, and the device is adjustable to enable mounting on bung receivers that are misaligned or set at an out-of-standard distance.

17 Claims, 9 Drawing Sheets

(56) References Cited

U.S. PATENT DOCUMENTS

| | | | |
|---|---|---|---|
| 4,345,468 A | 8/1982 | Jackson | |
| 4,787,657 A * | 11/1988 | Henniger | F16L 5/06 |
| | | | 174/660 |
| 5,323,653 A * | 6/1994 | Gruett | G01K 13/02 |
| | | | 374/E13.006 |
| 5,442,959 A | 8/1995 | Mills | |
| 6,234,018 B1 | 5/2001 | Kelada | |
| 6,532,815 B2 | 3/2003 | Wech | |
| 6,758,092 B2 | 7/2004 | Wech et al. | |
| 6,857,315 B1 | 2/2005 | Mills et al. | |
| 6,928,716 B2 | 8/2005 | Wech et al. | |
| 2002/0014118 A1 | 2/2002 | Wech | |
| 2004/0083809 A1 | 5/2004 | Wech et al. | |
| 2004/0250405 A1 | 12/2004 | Wech et al. | |
| 2015/0114109 A1* | 4/2015 | Wech | G01F 23/02 |
| | | | 73/323 |

\* cited by examiner

ADJUSTABLE SIGHT GAUGE AND DRUM BREATHER ASSEMBLY AND METHOD OF INSPECTING FLUID LEVEL WITH SAME

FIELD

The present disclosure is related to the field of fluid level sight gauges for verifying the fluid level in an object, such as a fifty-five gallon drum, manufacturing equipment, tank, or other article of manufacture.

BACKGROUND

Equipment and machines often require proper lubrication fluid levels to safely and effectively operate. Lubrication between moving surfaces decreases friction among components, decreases the risk of over-heating the machine, prevents contamination, reduces wear, and prevents costly maintenance repairs. Lubrication is often required for machine bearings, shafts, joints, and/or transmissions.

The following U.S. Patents are incorporated herein by reference in their entirety:

U.S. Pat. No. 5,442,959 discloses a sight gauge placed between two spaced apart compression type fittings connected to a vessel to show the liquid level in the vessel. The sight gauge has an elongated tubular transparent tube shield and a slightly longer elongated transparent sight tube that is received within the sight tube shield. An upper and a lower connection plate are each telescopically received by the sight tube, the sight tube shield being captured between the connection plates. An upper and a lower nozzle member each have an opening to respectively capture the upper and lower ends of the sight tube. An upper and lower elastomeric O-ring is received on the sight tube positioned between the connection plates and the nozzle members. Bolts secure the nozzle member to the compression plates to squeeze the O-rings against the sight tube so that the sight tube retains and supports the tube shield. Each nozzle member has an elongated tubular portion that can be received in a compression fitting.

U.S. Pat. No. 6,758,092 discloses an improved fluid level verification apparatus for use on liquid filled containers and configured to reduce inherent mechanical stresses on the inspection tube and resist leakage due to environmental, chemical, thermal or mechanical expansion cycles by using a protective shield member to encase the inspection sight member, and also a method for permanently sealing the fluid level detection apparatus.

U.S. Pat. No. 6,928,716 discloses an improved fluid level verification apparatus for use on liquid filled containers and configured to reduce inherent mechanical stresses on the inspection tube and resist leakage due to environmental, chemical, thermal or mechanical expansion cycles by using a protective shield member to encase the inspection sight member, and also a method for permanently sealing the fluid level detection apparatus.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In one embodiment, an adjustable sight gauge assembly for inspecting the fluid level in a container is connected to a container. The assembly includes a lower bung adapter having a first end, a first lateral opening, and a center bore, the center bore connecting the first end and the first lateral opening of the lower bung adapter. The assembly also includes a breather bung adapter including a first end, a second lateral opening, and a center bore, the center bore connecting the first end and the second lateral opening of the lower bung adapter. A drum breather including at least one bore, a mounting screw having a center bore connects the breather hung adapter to the drum breather, a breather rod having a center bore, a slide nut having a hole, an elongated sight tube having a first end, a second end, and a center bore, and an elongated sight guard including a first end, a second end, and a center bore are also included with the assembly. The first end of the sight tube is connected to the first lateral opening and the second end of the sight tube is connected to the slide nut. The first end of the sight guard is connected to the first lateral opening and the second end of the sight guard is connected to the slide nut. The sight tube being positioned in the center bore of the sight guard. The first end of the lower bung adapter and the first end of the breather bung adapter are connected to the container, and the drum breather is connected to the second lateral opening of the breather bung adapter. The breather rod is slidably positioned in the hole of the slide nut for slidable adjustment. The center bore of the lower bung adapter, the center bore of the sight tube, the center bore of the drum breather rod, the at least one bore of the drum breather, the center bore of the mounting screw, and the center bore of the breather bung adapter are connected. The breather rod slidably adjusts without breaking the connection between the center bore of the drum breather rod and the center bore of the sight tube.

In another embodiment, an adjustable sight gauge assembly for inspecting the fluid level in a container is connected to a container with the same size connections. The assembly includes a lower bung adapter and a breather bung adapter. The assembly also includes a drum breather having a breather rod and sight tube. The sight tube is connected to the lower bung adapter, and the lower bung adapter and the breather bung adapter are connected to the container. The breather rod is slidably connected to the sight tube.

The assembly may also include a method of visually inspecting the fluid level in a container through an adjustable sight gauge assembly. The method includes the steps of connecting a lower bung adapter having a first end and a first lateral opening to the container, connecting a breather bung adapter having a first end and a second lateral opening to the container, connecting an elongated sight tube to the first lateral opening and a slide nut having a hole, connecting a drum breather having a breather rod to the second lateral opening, slideably positioning the breather rod in hole of the slide nut, and slideably adjusting the position of the breather rod in the hole based on the distance between the position of the lower bung adapter and the breather bung adapter.

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

As disclosed in further detail herein, the present disclosure has advantageous features which create greater efficiencies when visually inspecting the lubrication fluid levels inside manufacturing equipment and fluid storage containers without disassembling the equipment or storage container. The assembly of the disclosure is adjustable to accommodate containers which have bung receivers installed at non-standard separation distances. The example setting, a manufacturing facility, is used herein for purposes of context, although it will be recognized by those of ordinary skill in the art that other settings and uses of the disclosure may find similar advantages.

It should be recognized by those of ordinary skill in the art that the embodiments disclosed herein are merely examples and are not intended to be limiting, while still providing examples of the wide array of physical properties which may be found in the assembly.

It is advantageous for a fluid level sight gauge to be connected to a machine that must be inspected to verify its current lubrication fluid level. The fluid level sight gauge allows the user to visually inspect and verify the fluid level inside the machine without disassembling major components of the machine. Additionally, it is advantageous to incorporate an assembly which can accept a desiccant breather and/or breather manifold systems to allow air to vent into and out of the lubrication tank as the fluid level in the machine changes.

Visual fluid level sight gauges with integral breather assemblies are also advantageous for verifying fluid levels in fluid storage containers. Often stock fluids such as lubricates, fuels, and water are kept in a manufacturing facility. For example, a manufacturing facility may have several fifty-five gallon drums containing lubrication fluids for each machine in the facility. As fluid is removed from the storage containers and placed into use, the fluid level in the storage containers decreases. A fluid level sight gauge located on the storage tank allows a user to inspect the fluid level in the storage tank and determine if the facility should purchase additional fluid if the tank is near empty.

Storage containers, such as fifty-five gallon drums, often have a lower bung receiver and an upper bung receiver connected to one end of the storage container. The distance between the two bung receivers is often set at a standard distance across drum manufacturers. However, it is inherent in the manufacturing process for variations in the distance between bung receivers. Therefore, it is advantageous for a sight gauge to be adjustable to accommodate non-standard distances and manufacturing variations between bung receivers.

The inventors have discovered that due to the nature of verifying fluid levels on machines and containers, it is advantageous to combine a sight gauge and a breather assembly into a single adjustable assembly which can accommodate various distances between bung receivers. Further, it is advantageous to combine a sight gauge and a breather assembly to prevent contaminates from entering the drum or container while still allowing the drum or container to breath and a user to visually verify the fluid level.

Figure 1:
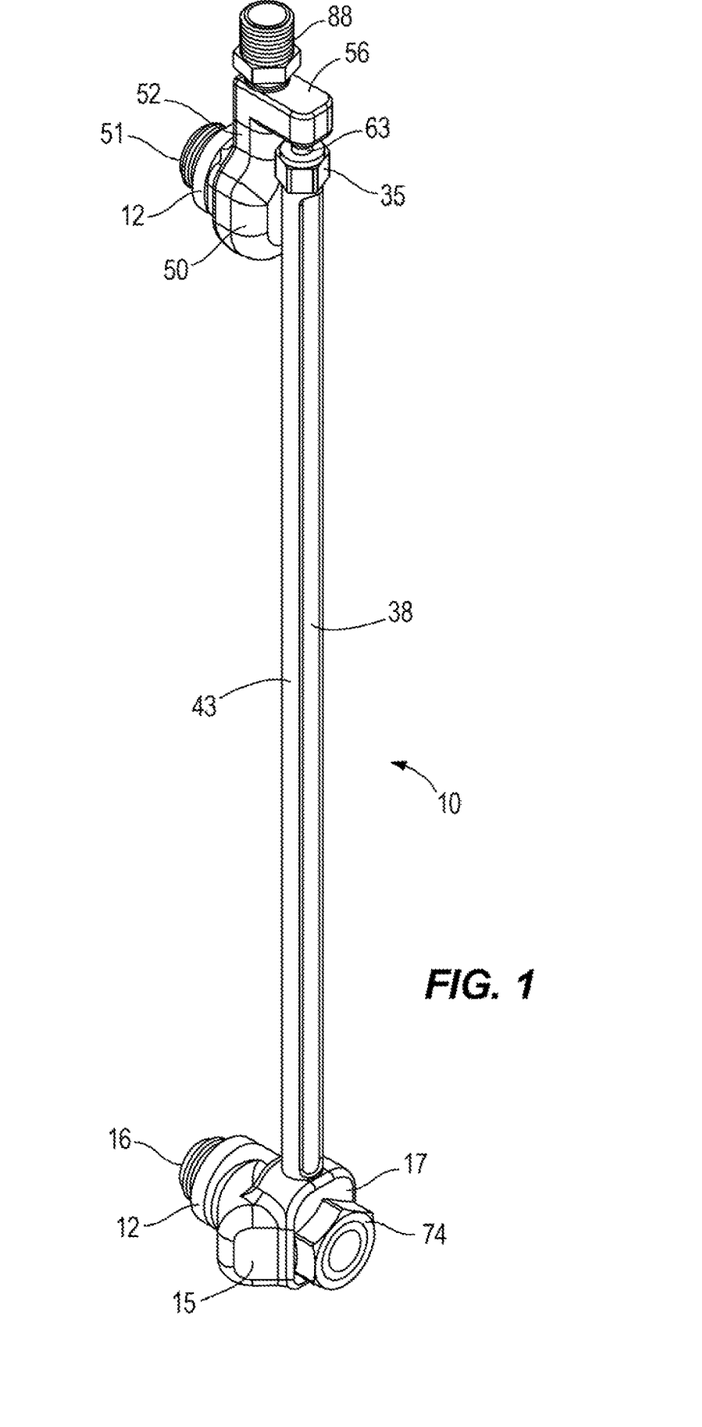
FIG. 1 is an isometric view of an embodiment of an assembly of the present application.
Figure 2:
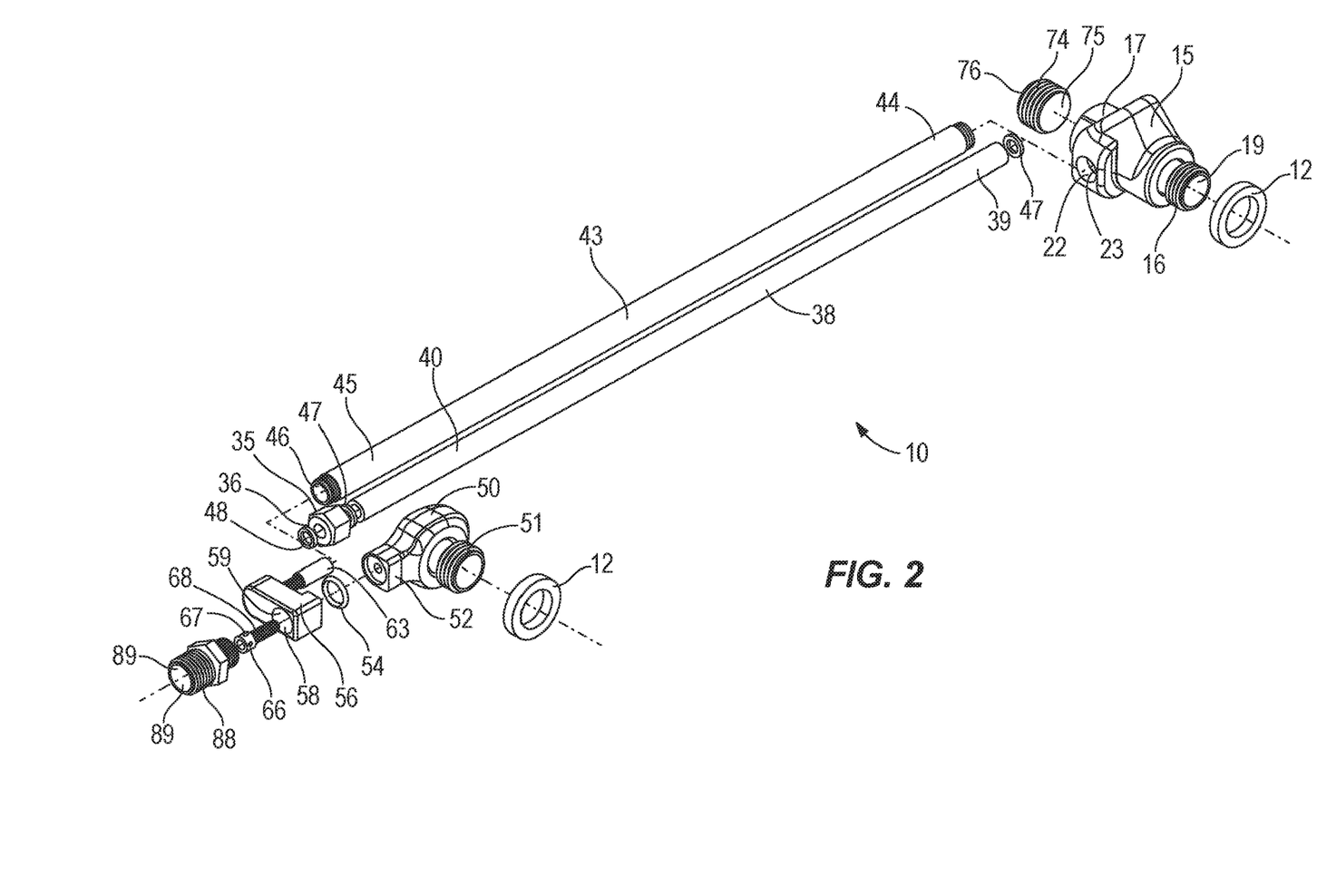
FIG. 2 is an exploded isometric view of the embodiment of the assembly depicted in FIG. 1.

FIGS. 1-2 depict a sight gauge and breather assembly 10 for visually inspecting the fluid level within a container. Generally, the assembly 10 is connected to the container with a lower bung adapter 15 and a breather bung adapter 50, which are further described herein. It should be known by a person having ordinary skill in the art that the lower bung adapter 15, the breather bung adapter 50, and other components of the assembly 10, described herein, may be connected to the container and/or other components of the assembly 10 using a variety of connectors including screw threads, adhesives, snap fitting, friction, pressure forces, male end connectors, female end connectors, and/or in combination.

The lower bung adapter 15 is connected to the lower bung receiver (not shown) of the container. The lower bung adapter 15 has a plurality of sides, faces, and ends. In one embodiment, the lower bung adapter 15 has a plurality of planer geometric faces. However, it is also contemplated that the lower bung adapter 15 may be any shape. The lower bung adapter 15 includes a first end 16 and a second end 17. The first end 16 of the lower bung adapter 15 connects to the lower bung receiver. Additional components of the assembly 10 may be attached to the second end 17 of the lower bung adapter 15, as described herein. A center channel bore 19 connects the first end 16 of the lower bung adapter 15 and the second end 17 of the lower bung adapter 15.

A gasket 12 located between the first end 16 of the lower bung adapter 15 and the lower bung receiver creates a fluid tight seal. The gasket 12 may be made out of any suitable material known in the art such as silicone, rubber, or plastic. The lower bung adapter 15 also includes a first lateral opening 22. A first lateral opening bore 23 extending through the first lateral opening 22 of the lower bung adapter 15 to the center channel bore 19. It is contemplated that additional ends and/or openings may be included with the lower bung adapter 15.

A hex plug 74 is removably connected to the second end 17 of lower bung adapter 15. The hex plug 74 includes a first end 75 and a second end 76. The first end 75 is connected to the second end 17 of the lower bung adapter 15. The hex plug 74 caps the center channel bore 19 and prevents fluid from flowing from the second end 17 of the lower bung adapter 15. The hex plug 74 and/or second end 17 of the lower bung adapter 15 may also allow other components to be connected to the assembly 10 such as drain lines, spigots, monitoring equipment, or other devices.

An elongated sight guard 43 and an elongated sight tube 38 are connected to the first lateral opening 22 of the lower bung adapter 15. The sight tube 38 is a transparent tubular member having a center bore 41. The sight tube 38 is made of a transparent material such as plastic, glass, or some other transparent material. The user may visually inspect the fluid level in the container by viewing the fluid level in the sight tube 38. The sight tube 38 includes a first end 39, a second end 40, and defines a center bore 41. The sight guard 43 includes a first end 44, a second end 45, and a center bore 46. The sight guard 43 is designed to protect the sight tube 38 from damage. The sight guard 43 is made from any material including the material of the sight tube 38. For instance, the sight guard 43 may be constructed from metal, rigid plastic, or other suitable material. The sight guard 43 includes holes or cut-outs which allow only certain portions of the sight tube 38 to be visually inspected.

The sight guard 43 and sight tube 38 are connected to the first lateral opening 22 by positioning the sight tube 38 in the center bore 46 of the sight guard 43. A first gasket 47 is placed between the first end 39 of the sight tube 38 and the first lateral opening 22 of the lower bung adapter 15. The first end 44 of the sight guard 43 is connected to the first lateral opening 22 of the lower bung adapter 15 by screw threads or some other connector known in the art. A second gasket 47 is located between the second end 40 of the sight tube 38 and a slide nut 35. As the second end 45 of the sight guard 43 is connected to the slide nut 35, a compression force to be applied to the gaskets 47. The compression force creates a fluid tight seal between the first end 39 of the sight tube and the first lateral opening 22, as well as, the second end 40 of the sight tube 38 and the slide nut 35. The slide nut 35 includes a hole 36 positioned adjacent to the center bore 41 of the sight tube 38 and an o-ring groove. To seat an o-ring 48 in the o-ring groove, the o-ring 48 is placed into the slide nut 35 though the hole 36 of the slide nut 35. The o-ring 48 creates a fluid tight seal between a breather rod 63 and the sight tube 38. In another example, the first end 39 the sight tube 38 is connected to the first lateral opening 22 of the lower bung adapter 15 and the second end 40 of the sight tube 38 is connected to the gasket 47 and/or o-ring 48.

The breather bung adapter 50 is connected to the upper bung receiver. The breather bung adapter 50 has a plurality of sides, faces, and ends. In one embodiment, the breather bung adapter 50 has a plurality of planer geometric faces. However, it is also contemplated that the breather bung adapter 50 may be any shape. The breather bung adapter 50 has a first end 51 and a second lateral opening 52.

A gasket 12 is located between the first end 51 of the breather bung adapter 50 and the upper bung receiver to create a fluid tight seal. The gasket 12 may be made out of any suitable material such as silicone, rubber, plastic, or plastic. A bore 55 creates a fluid path between the first end 51 of the breather bung adapter 50 and the second lateral opening 52 of the breather bung adapter 50.

A drum breather 56 is connected to the second lateral opening 52 of the breather bung adapter 50. The drum breather 56 in this embodiment is rectangularly shaped and includes several bores. A first bore 58 of the drum breather 56 extends vertically through the drum breather 56 and includes a first portion 59 having a diameter D1 and a second portion 60 having a diameter D2. A second bore 61 and a third bore 65 may also be included. The third bore 65 of the drum breather 56 creates a hole 62 on a surface of the drum breather 56. In one example, the first bore 58, the second bore 61, and the third bore 65 are interconnected. It should be known to those having ordinary skill in the art that drum breather 56 may have any number of bores including a single bore or a plurality of bores. A breather rod 63 is connected to the hole 62 and protrudes away from the drum breather 56. The breather rod 63 has a center bore 64, and the length of the breather rod 63 allows the assembly 10 to adjust vertically into and out of the hole 36 of the slide nut 35 to accommodate distance variations between the lower bung receiver and the upper bung receiver. In one example, the length of the breather rod 63 allows a quarter of an inch distance variance between the lower bung receiver and the upper bung receiver. The breather rod 63 is slidably connected to the gasket 48 and slide nut 35 to maintain a closed fluid path through the assembly 10. Further, the breather rod 63 may be slidable with the o-ring 48 and slide nut 35 without becoming disconnected from the assembly 10. It should be known to those having ordinary skill in the art that the breather rod 63 can be any length. In another example, the breather rod 63 may be slidably connected to the gasket 48 and the second end 40 of the sight tube 38.

The drum breather 56 is connected to the breather bung adapter 50 by a mounting screw 66. The mounting screw 66, includes a first end 67 having a diameter D3, a second end 68 having a diameter D4, and a center bore 69, is inserted into the first portion 59 of the first bore 58 of the drum breather 56 and the second portion 60 of the first bore 58 of the drum breather 56. Diameter D4 is approximately the same dimension as diameter D2, and diameter D3 is approximately the same dimension as diameter D1. The second end 68 of the mounting screw 66 connects with the second lateral opening 52 of the breather bung adapter 50. As the second end 68 engages with the second lateral opening 52, a compression force acts on the gasket 54 creating a fluid tight seal between the drum breather 56 and the breather bung adapter 50. The first end 67 of the mounting screw 66 does not pass through the second portion 60 of the first bore 58 of the drum breather 56. A nipple nut 88 is connected to the first portion 59 of the first bore 58 of the drum breather 56. The nipple nut 88 includes a center bore 89 which allows air to move into and out of the assembly 10. Desiccant breathers 100 may also be attached to the nipple nut 88 to filter and remove moisture from the air moving into and out of the container.

In one example, the assembly 10 is attached to the container by first connecting the lower bung adapter 15 to the lower bung receiver and connecting the breather bung adapter 50 to the upper bung receiver. Next, the sight tube 38, sight guard 43, and slide nut 35 are then attached to the lower bung adapter 15, as described above. Next, the breather rod 63, which is connected to the drum breather 56, is slidably inserted into the hole 36 of the slide nut 35. Finally, the mounting screw 66 connects the drum breather 56 to the breather bung adapter 50.

As described above, the assembly 10 includes a combination of interconnected bores and channels that allow air and/or fluid to move freely within the assembly 10. The movement of fluid in the assembly into the sight tube 38 allows the user to visually inspect the fluid level in the container. The fluid moves into the assembly 10 and into the sight tube 38 due to the fluid pressure acting on the fluid in the container. As fluid moves into and out of the sight tube 38, the interconnected bores allow air to flow into and out of the assembly 10 and container. This is advantageous for proper venting of the container, increasing flow of fluid out of the container, and preventing contaminates from entering the container.

Figure 3:
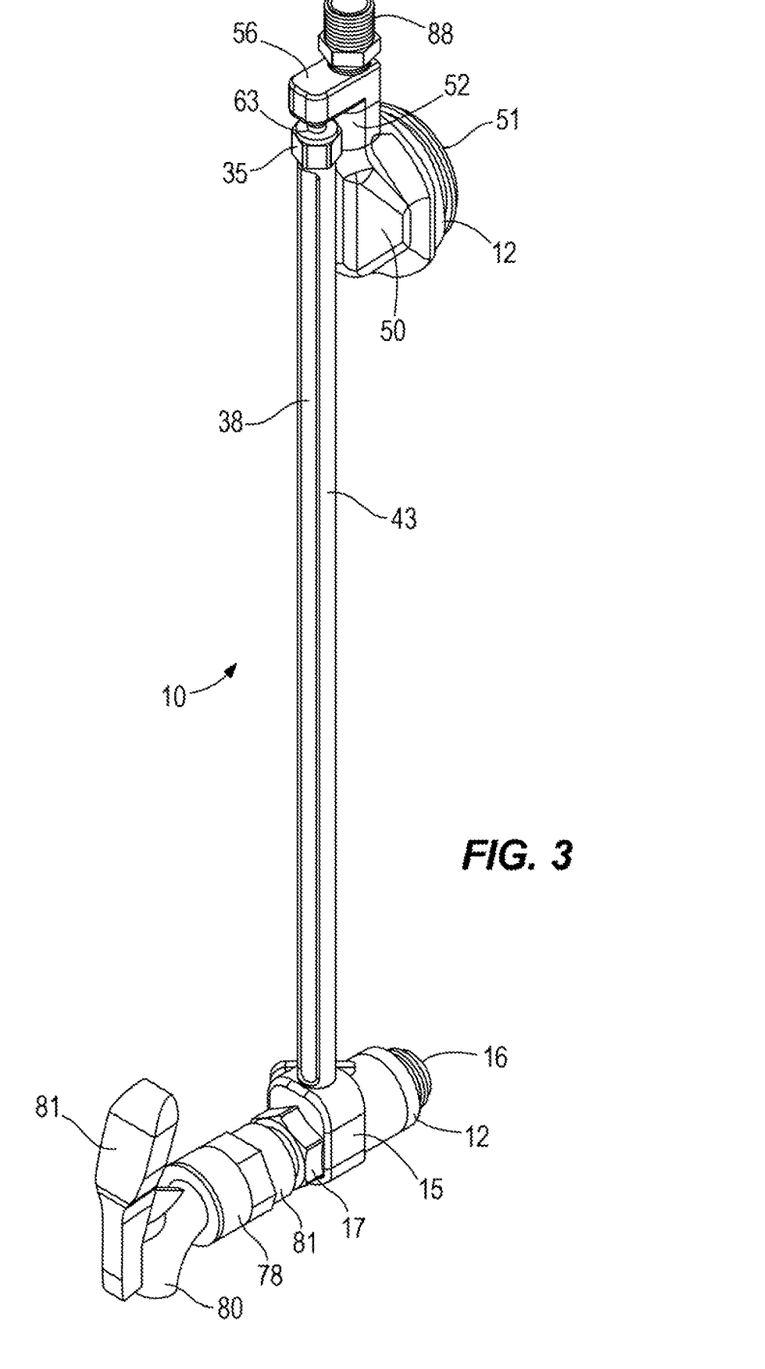
FIG. 3 is an isometric view of an additional embodiment of an assembly of the present application.
Figure 4:
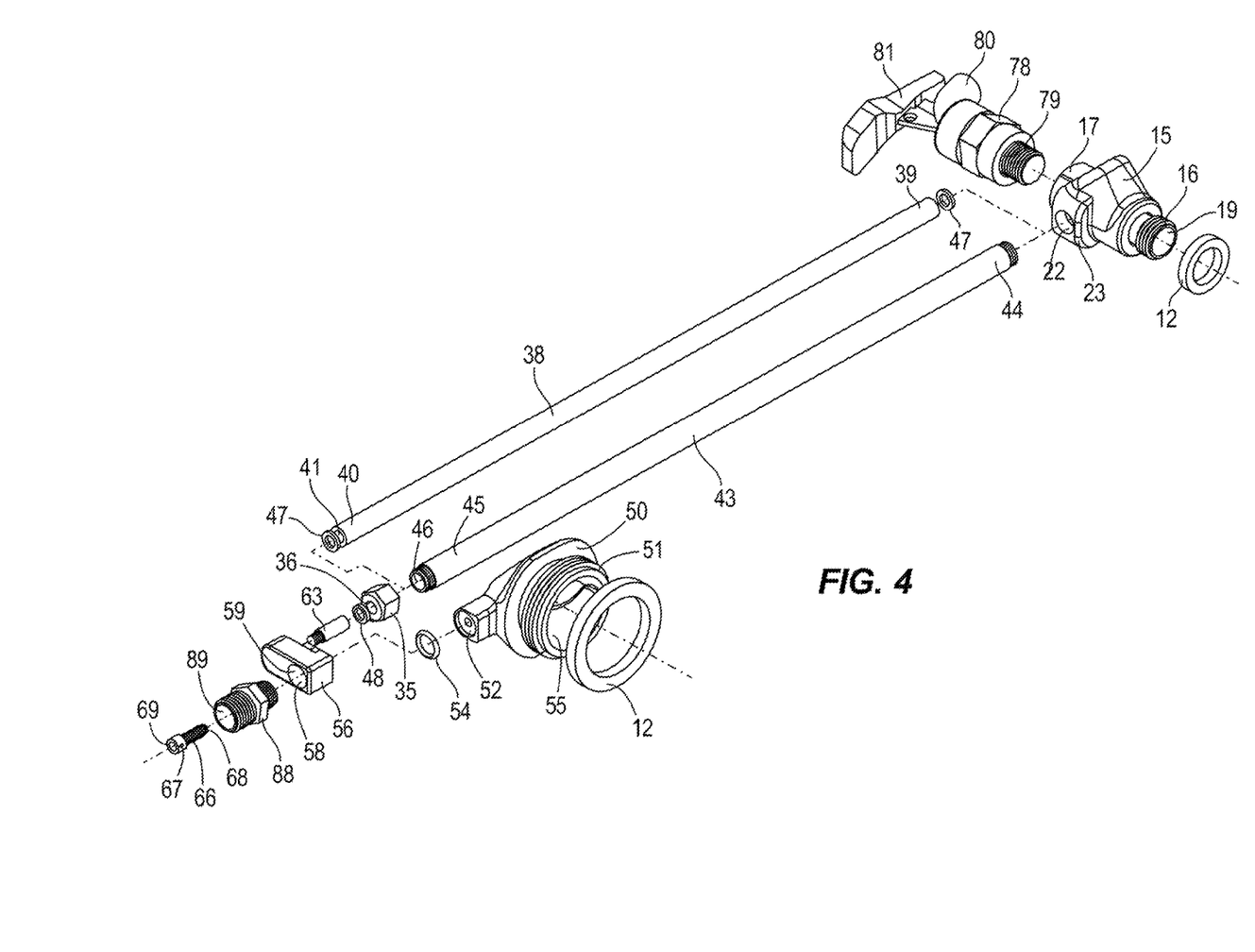
FIG. 4 is an exploded isometric view of the embodiment of the assembly depicted in FIG. 3.

Turning now to FIGS. 3-4, a second embodiment of the assembly 10 is depicted. The second embodiment includes many of the components discussed above. The assembly 10 of this embodiment includes a dispensing nozzle 78. The nozzle 78 includes a first end 79, a second end 80, and a handle 81. The first end 79 of the nozzle 78 includes connects to the second end 17 of the lower bung adapter 15. The second end 80 of the nozzle 78 is a spout. However, one having ordinary skill in the art should understand any other type of end may be used such as a tube, valve, or the like. An operable handle 81 is attached to the outer surface of the nozzle 78 and is connected to an internal valve (not shown) within the nozzle 78. The handle 81 opens and/or closes the internal valve to start or stop the flow of fluid out of the nozzle 78.

In operation, moving the handle 81 to an open position causes the internal valve to open and fluid to flow out of the second end 80 of the nozzle 78. When the handle 81 is in a closed position, no fluid flows out of the second end 80 of the nozzle 78. This example can be used on a fifty-five gallon drum containing stock fluid which can be dispensed and transferred to another location. The user may also check the level of the remaining stock fluid through the sight tube 38.

Figure 5:
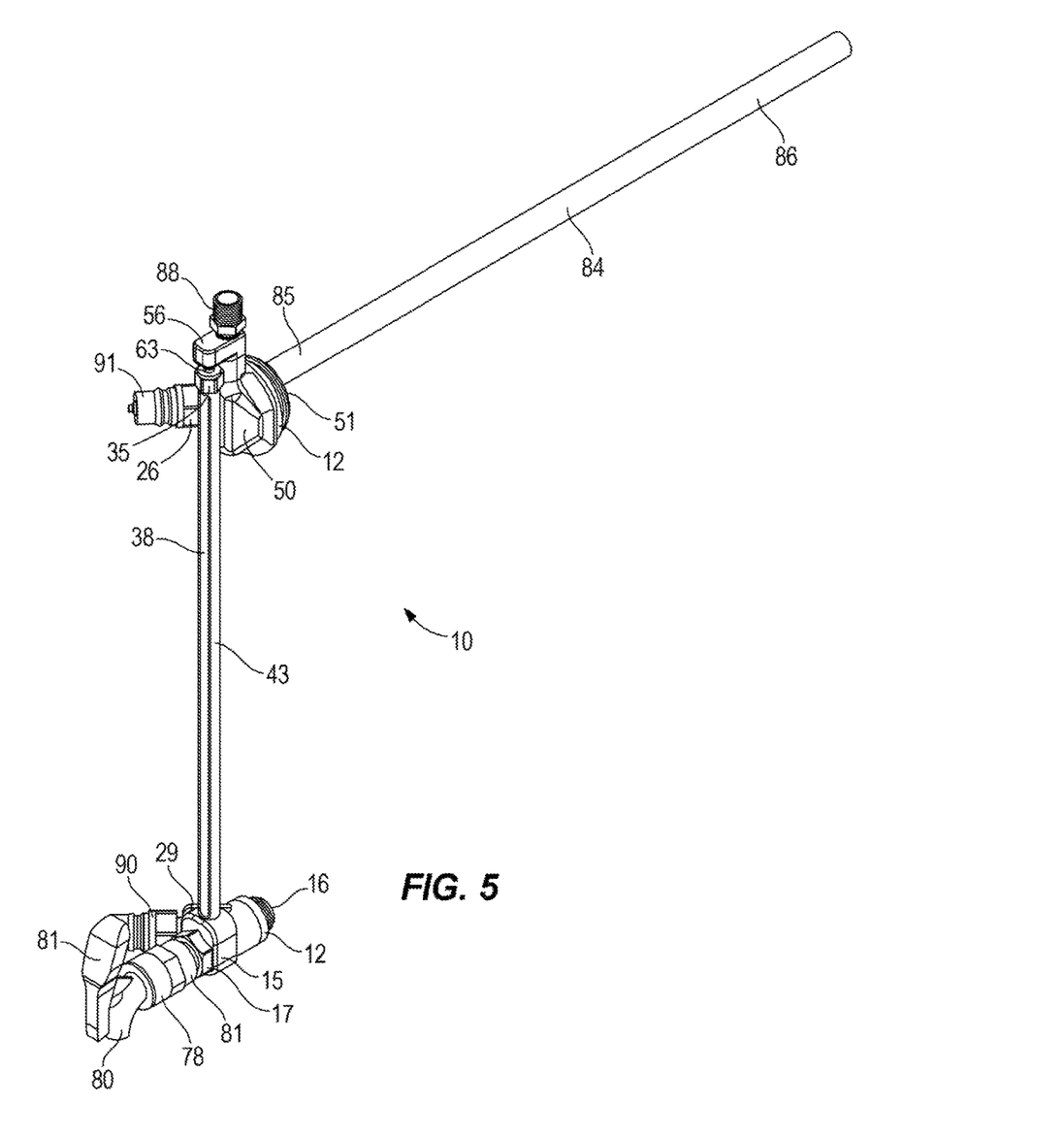
FIG. 5 is an isometric view of an additional embodiment of an assembly of the present application.
Figure 6:
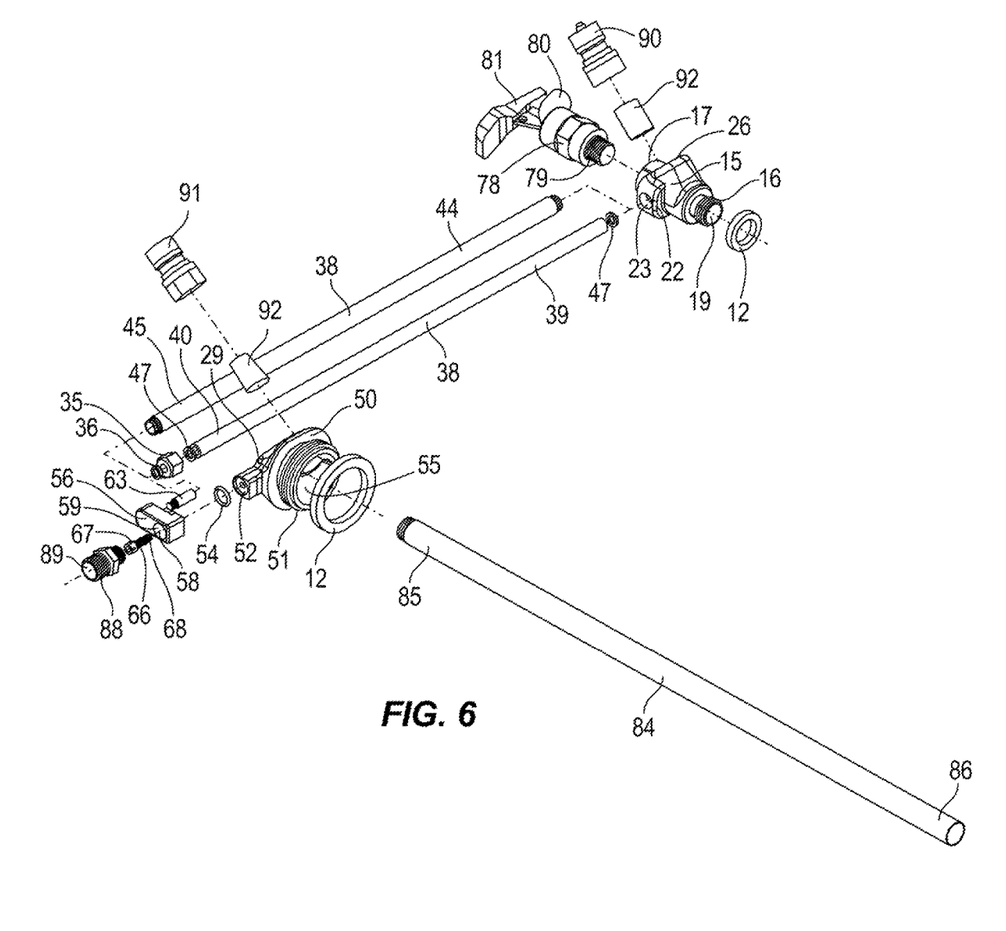
FIG. 6 is an exploded isometric view of the embodiment of the assembly depicted in FIG. 5.

Turning now to FIGS. 5-6, a third embodiment of the assembly 10 is depicted. This third embodiment includes many of the components discussed above. The assembly 10 includes a dispensing nozzle 78 and two quick disconnect valves 90, 91. The nozzle 78 includes a first end 79, a second end 80, and a handle 81. The first end 79 of the nozzle 78 includes connects to the second end 17 of the lower bung adapter 15. The second end 80 of the nozzle 78 is a spout. First quick disconnect valve 90 is connected to the lower bung adapter 15 at a first auxiliary lateral opening 26. The first auxiliary lateral opening 26 includes an auxiliary bore (not shown) which intersects with the center channel bore 19 of the lower bung adapter 15. A second quick disconnect valve 91 is connected to the breather bung adapter 56 at a second auxiliary lateral opening 29. The second auxiliary lateral opening 29 includes an auxiliary bore (not shown) which intersects with the bore 55 of the breather bung adapter 50. A close nipple 92 may also be connected to the first auxiliary lateral opening 26 and/or the second auxiliary lateral opening 29.

A circulation tube 84 including a first end 85 and a second end 86 is connected to the breather bung adapter 50. The first end 85 of the circulation tube 84 connects to the auxiliary bore of the second auxiliary lateral opening 29. The second end 86 of the circulation tube 84 extends rearwardly into the interior of the container. In operation, a circulation pump (not shown) is connected to the first quick disconnect 90 and second quick disconnect 91. The circulation pump draws fluid out of the container through first quick disconnect 90 and the circulation pump returns the fluid to the container through the second quick disconnect 91 and circulation tube 84. The returned fluid travels through the circulation tube 84 to the rear of the container. The circulation path properly mixes the fluid within the container. This embodiment is advantageous for fluids within large containers, fluids that may separate from one another over time, or containers with filtration equipment. Circulating the fluid maintains homogenous characteristics of the fluid and/or full filtration of the fluid within the container.

Figure 7:
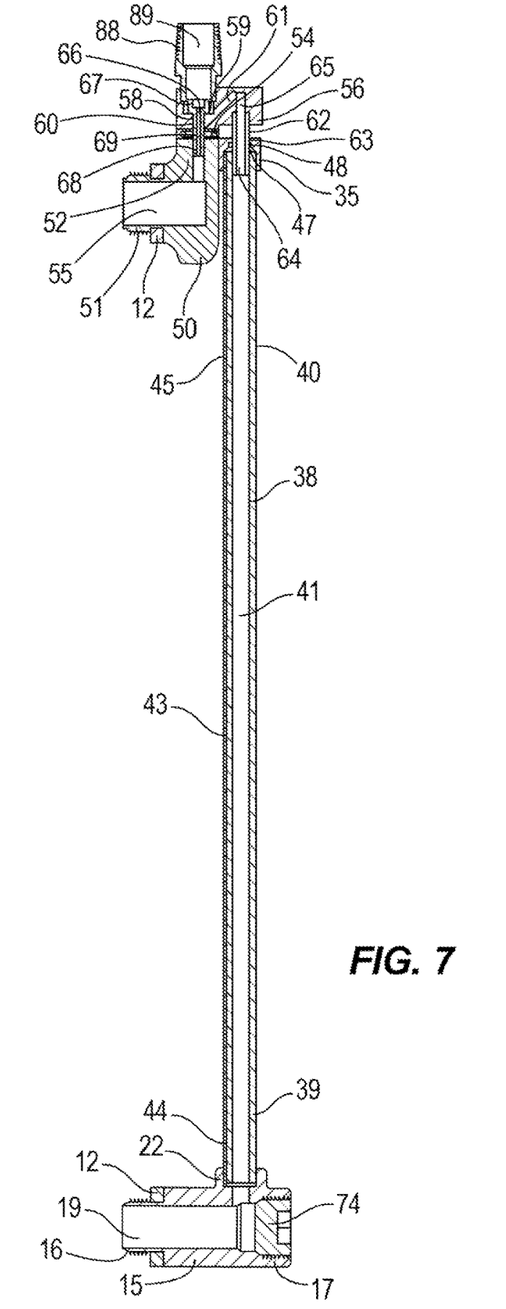
FIG. 7 is a cross sectional view along the centerline of the assembly depicted in FIGS. 1-2.

FIG. 7 depicts a cross sectional view of the assembly 10 depicted in FIGS. 1-2. It should be known to those having ordinary skill in the art that the cross sectional view depicted FIG. 7 represents only one example and other examples of the assembly 10 may have similar components and/or additional components.

Figure 8:
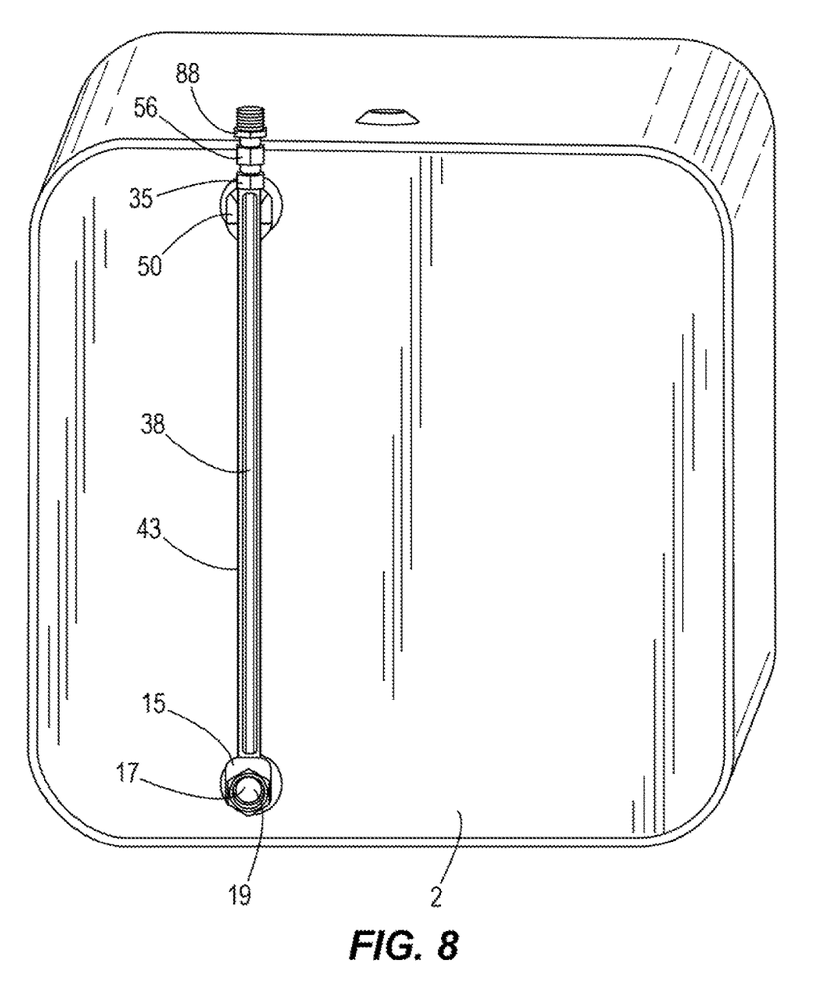
FIG. 8 is an isometric view of the embodiment of the assembly depicted in FIGS. 1-2 connected to a container.

FIG. 8 depicts an embodiment of the assembly 10 connected to a container 2. It should be known to those having ordinary skill in the art that any example of the assembly 10 may be connected to the container 2.

Figure 9:
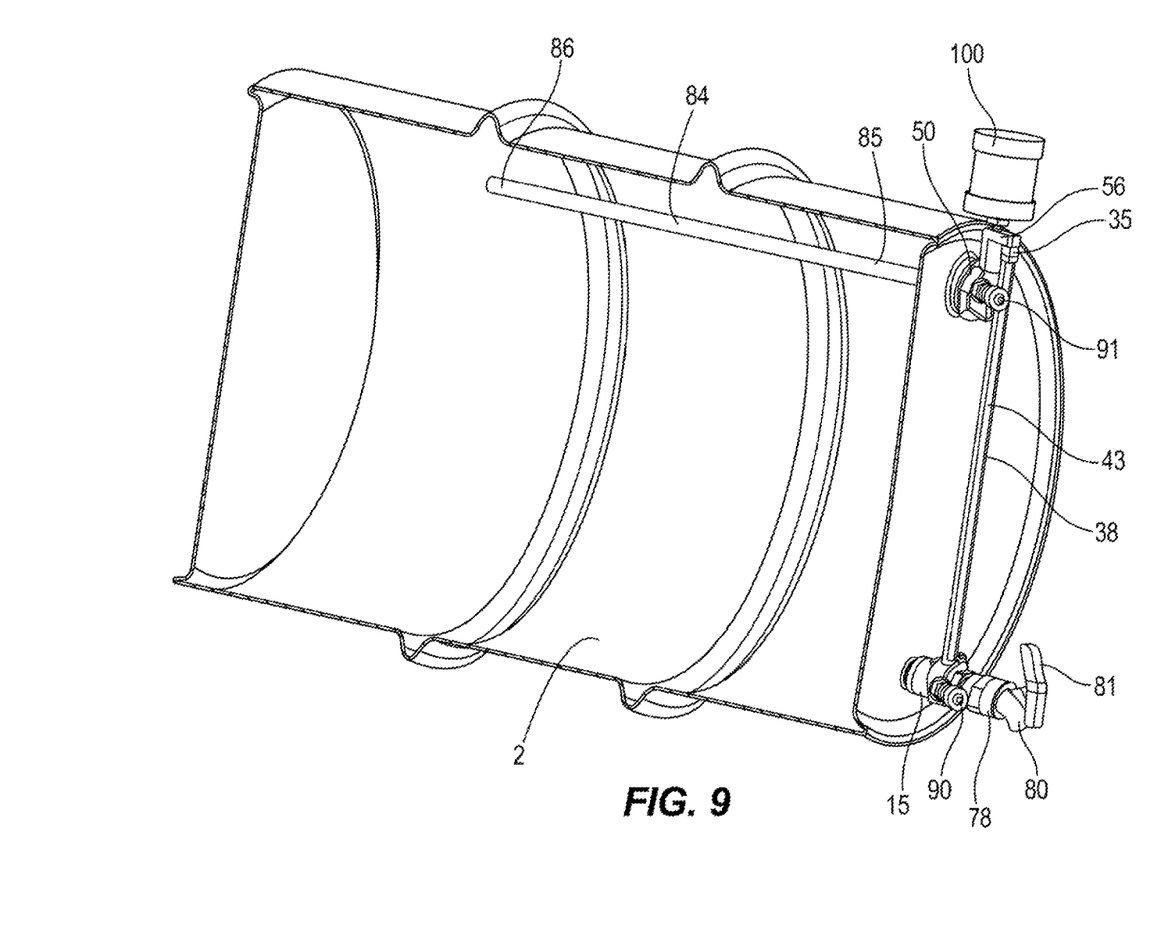
FIG. 9 is an isometric cutaway view of a container with the embodiment of the assembly depicted in FIGS. 5-6 connected to the drum or container.

FIG. 9 depicts the embodiment depicted in FIGS. 5-6 connected to the container 2.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An adjustable sight gauge assembly for inspecting a fluid level of a fluid in a container having a top and a side, the adjustable sight gauge assembly comprising:
   a lower bung adapter defining a center bore and configured to couple to the container;
   a breather bung adapter defining a center bore and having a first end configured to couple to the container and a lateral opening positioned vertically above the first end;
   a sight tube coupled to the lower bung adapter and configured to display the fluid level, the sight tube has a center bore that extends vertically above the fluid level and along the breather bung adapter such that the sight tube is configured to display the fluid level when the fluid level in the container is at the first end of the breather bung adapter;
   a drum breather defining at least one bore and including a breather rod having a center bore, wherein the drum breather couples the breather bung adapter to the sight tube; and
   a mounting screw having a center bore, wherein the mounting screw couples the drum breather to the breather bung adapter;
   wherein the center bores of the lower bung adapter, the breather bung adapter, the breather rod, the mounting screw, and the sight tube and the at least one bore of the drum breather form a fluid path;
   wherein the breather rod is slideable in the center bore defined by the sight tube to thereby accommodate various distances between the lower bung adapter and the breather bung adapter while maintaining the fluid path; and
   wherein the center bore of the breather bung adapter extends between the first end of the breather bung adapter and the lateral opening of the breather bung adapter, and wherein the center bore of the breather drum adapter has a section that is parallel to and offset from the center bore of the sight tube;
   wherein the lower bung adapter and the breather bung adapter are coupled to the side of the container and the drum breather and the center bore of the sight tube extend vertically above the breather bung adapter in a direction towards the top of the container; and
   wherein the sight tube is operable to display the fluid level when the fluid level in the container is between the center bore of the breather bung adapter and the top of the container.

2. The adjustable sight gauge assembly of claim 1, further comprising a sight guard that is coupled to the lower bung adapter and a slide nut and configured to protect the sight tube from damage.

3. The adjustable sight gauge assembly of claim 2, further comprising:

at least one gasket positioned between at least two of the container, the lower bung adapter, the breather bung adapter, the drum breather, the sight tube, the sight guard, and the breather rod.

4. The adjustable sight gauge assembly of claim 1, further comprising a nozzle coupled to the lower bung adapter and having an operable handle configured to facilitate controlling the flow of fluid from the nozzle.

5. The adjustable sight gauge assembly of claim 1, further comprising:
   a first quick disconnect coupled to the lower bung adapter;
   a second quick disconnect coupled to the breather bung adapter; and
   a circulation tube coupled to the first quick disconnect and the second quick disconnect such that the fluid in the container can be circulated through the first quick disconnect, the second quick disconnect, and circulation tube.

6. An adjustable sight gauge assembly for inspecting the fluid level in a container having a top and a side, the adjustable sight gauge assembly comprising:
   a lower bung adapter including a first end, a first lateral opening, and a center bore, the center bore connecting the first end and the first lateral opening of the lower bung adapter;
   a breather bung adapter including a first end configured to couple to the container, a second lateral opening, and a center bore, the center bore connecting the first end and the second lateral opening of the breather bung adapter;
   a drum breather including at least one bore, wherein the drum breather couples the breather bung adapter to the sight tube;
   a mounting screw including a center bore, wherein the mounting screw couples the drum breather to the breather bung adapter;
   a breather rod including a center bore;
   a slide nut including a hole;
   an elongated sight tube including a first end, a second end, and a center bore, the first end of the sight tube connected to the first lateral opening and the second end of the sight tube connected to the slide nut, and wherein the center bore of the elongated sight tube extends vertically above the first end of the breather bung adapter such that the elongated sight tube is configured to display the fluid level when the fluid level in the container is at the first end of the breather bung adapter; and
   an elongated sight guard including a first end, a second end, and a center bore, the first end of the sight guard connected to the first lateral opening and the second end of the sight guard connected to the slide nut, the sight tube being positioned in the center bore of the sight guard;
   wherein the first end of the lower bung adapter and the first end of the breather bung adapter are connected to the container;
   wherein the drum breather is connected to the second lateral opening of the breather bung adapter and the breather rod is slidably positioned in the hole of the slide nut;
   wherein the center bore of the lower bung adapter, the center bore of the sight tube, the center bore of the drum breather rod, the at least one bore of the drum breather, the center bore of the mounting screw, and the center bore of the breather bung adapter are connected;
   wherein the breather rod slidably adjusts without breaking the connection between the center bore of the drum breather rod and the center bore of the sight tube;
   wherein the lateral opening of the breather bung adapter is positioned vertically above the first end of the breather bung adapter, wherein the center bore of the breather bung adapter extends between the first end and the lateral opening, and wherein the center bore of the breather drum adapter has a section that is parallel to and offset from the center bore of the sight tube;
   wherein the lower bung adapter and the breather bung adapter are coupled to the side of the container and the drum breather and the center bore of the sight tube extend vertically above the breather bung adapter in a direction towards the top of the container; and
   wherein the sight tube is operable to display the fluid level when the fluid level in the container is between the center bore of the breather bung adapter and the top of the container.

7. The adjustable sight gauge assembly of claim 6, wherein the lower bung adapter further comprises a second end that couples to the center bore of the lower bung adapter.

8. The adjustable sight gauge assembly of claim 7, further comprising a hex plug including a first end and a second end opposite the first end, wherein the first end is connected to the second end of the lower bung adapter.

9. The adjustable sight gauge assembly of claim 7, further comprising a nozzle including a first end, a second end opposite the first end, and a handle, wherein the first end of the nozzle is coupled to the second end of the lower bung adapter and the handle is operable to control the flow of fluid through the second end of the nozzle.

10. The adjustable sight gauge assembly of claim 6, further comprising a nipple nut defining a center bore and the nipple nut coupled to the drum breather such that the center bore defined by the nipple nut is in communication with the center bore of the center bore of the drum breather.

11. The adjustable sight gauge assembly of claim 6, further comprising:
    a first auxiliary lateral opening included with the lower bung adapter, the first auxiliary lateral opening defining an auxiliary bore which intersects the central bore of the lower bung adapter;
    a second auxiliary lateral opening included with the breather bung adapter, the second auxiliary lateral opening defining an auxiliary bore which intersects with the central bore of the breather bung adapter;
    a first quick disconnect connected to the first auxiliary lateral opening;
    a second quick disconnect connected to the second auxiliary lateral opening; and
    a circulation tube including the a first end and a second end opposite the first end, wherein the first end is coupled to the breather bung adapter;
    wherein the fluid in the container can be circulated through the first quick disconnect, the second quick disconnect, and circulation tube.

12. The adjustable sight gauge assembly of claim 6, further comprising:
    at least one gasket positioned between at least two of the container, the lower bung adapter, the breather bung adapter, the drum breather, the slide nut, the sight tube, the sight guard, and the breather rod.

13. A method of visually inspecting the fluid level in a container, having a top and a side, through an adjustable sight gauge assembly comprising the steps of:

connecting a lower bung adapter including a first end and a first lateral opening to the side of the container;

connecting a breather bung adapter, including a first end, a center bore, and a second lateral opening, to the side of the container;

connecting a elongated sight tube to the first lateral opening and a slide nut including a hole, the elongated sight tube has a center bore that extends vertically above the fluid level and along the breather bung adapter and is configured to display the fluid level when the fluid level in the container is at the breather bung adapter;

connecting a drum breather to the second lateral opening to extend vertically above the breather bung adapter in a direction towards the top of the container, the drum breather including a breather rod;

slideably positioning the breather rod in the hole of the slide nut to thereby couple the sight tube to the breather bung adapter to extend vertically above the breather bung adapter in a direction towards the top of the container;

slideably adjusting the position of the breather rod in the hole based on the distance between the position of the lower bung adapter and the breather bung adapter;

wherein the center bore of the breather bung adapter extends between the first end of the breather bung adapter and the second lateral opening of the breather bung adapter, the center bore of the breather drum adapter has a section that is parallel to and offset from the center bore of the sight tube, and the sight tube is operable to display the fluid level when the fluid level in the container is between the center bore of the breather bung adapter and the top of the container.

14. The method of claim 13 further comprising:
positioning the elongated sight tube in an elongated sight guard, the first end of the sight guard connected to the first lateral opening and the second end of the sight guard connected to the slide nut.

15. The method of claim 13, wherein the lower bung adapter further comprises a second end; and further comprising connecting at least one of a hex plug and nozzle to the second end of the lower bung adapter.

16. The method of claim 13 further comprising connecting a nipple nut to the drum breather.

17. The method of claim 13 further comprising:
connecting first disconnect to the lower bung adapter, the lower bung adapter including a first auxiliary lateral opening;
connecting second disconnect to the breather bung adapter, the breather bung adapter including a second auxiliary lateral opening;
connecting a circulation tube to the breather bung adapter; and
circulating fluid in the container from the first quick disconnect to the second quick disconnect, through the circulation tube, and returning back into the container.

* * * * *